INVENTOR

Leo F. Lechtenberg

March 30, 1937.  L. F. LECHTENBERG  2,075,781

TRACTOR SEMITRAILER FIFTH WHEEL STRUCTURE

Original Filed Feb. 19, 1934   2 Sheets-Sheet 2

INVENTOR
Leo F. Lechtenberg

Patented Mar. 30, 1937

2,075,781

UNITED STATES PATENT OFFICE 2,075,781

TRACTOR SEMITRAILER FIFTH WHEEL STRUCTURE

Leo F. Lechtenberg, Quincy, Ill., assignor to Electric Wheel Company, Quincy, Ill.

Original application February 19, 1934, Serial No. 711,861. Divided and this application July 29, 1935, Serial No. 33,678

1 Claim. (Cl. 280—33.1)

My invention relates to the art of road vehicles and particularly to the coupling means employed between a tractor vehicle and a trailer or towed vehicle frequently called a semi-trailer.

The coupling means embodies a fifth wheel comprising an upper plate attached to the front of the trailer said upper plate having a downward projecting king pin to couple with a lower fifth wheel member. The lower fifth wheel member is pivotally attached to the rear end of the tractor and equipped with an automatic locking device for coupling the two fifth wheel units together.

It is to my locking device that my present invention is especially directed, therefore one of the objects of my invention is to provide an automatic safety lock for a semi-trailer king pin connection consisting of a horizontal latch held firmly in place by the rectangular end of an automatic lever dropping in place between the latch and an integral abutment on the lower fifth wheel to hold same securely locked until the releasing lever is manually released. Another object is to provide a large bearing surface for the king pin while engaged in a pulling position.

A further object is to secure long wear on the king pin latch by hardening this part over its entire surface.

Further it is an object to provide a construction with as small a number of parts as possible to accomplish the desired results. As an illustration the horizontal latch is made of one piece and the contact portion for operating the latch is also of one piece. The fifth wheel carrying the latch is made of a one-piece steel casting with the latch retaining receptacle integral having an enclosed side in front to make locking of the king pin effective even if its operating pins should fail thus assuring the maximum of safety with a minimum of parts.

The above together with other details of construction will be more fully described in the following detailed description and afterwards be particularly pointed out in the appended claims, reference being had to the accompanying drawings in which:

Figure 1:
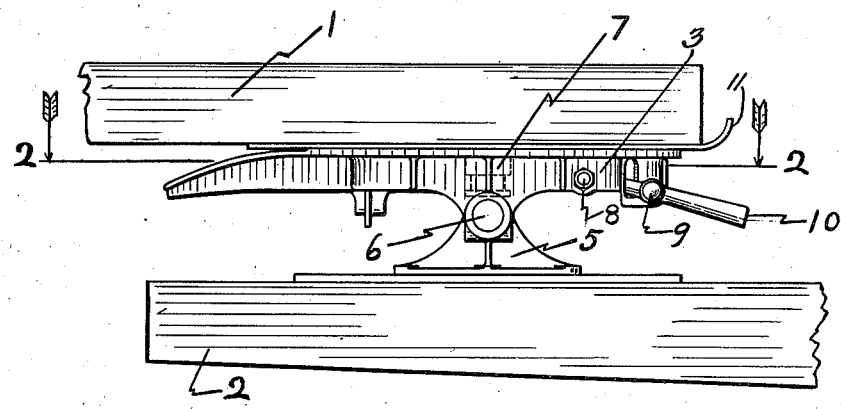
Figure 1 is a side elevational view showing the rear end of a tractor and the forward end of a trailer connected through a fifth wheel means.
Figure 4:
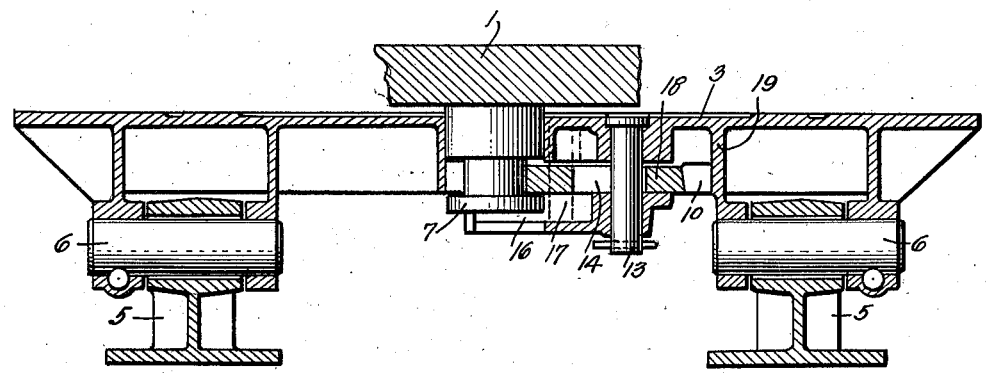
Figure 4 is a part section through line 4—4 of Figure 3 illustrating the latching mechanism in an end view. Referring to the drawings in detail.

The frame of the trailer is illustrated at 1 and the frame of the tractor as 2 both in Figure 1.

Mounted upon the tractor frame are two brackets 5; supporting the lower fifth wheel on the tractor through the transverse pins 6. The lower fifth wheel is shown at 3, and is provided with inwardly extending wings 12 which define a V-shaped opening leading into an aperture 15 for guiding the king pin 7 into the latch 18 also shown in Figure 3.

The upper fifth wheel 11 on the trailer 1 comprises a suitable surface member for resting on the lower fifth wheel 3, and may be a plate or ring secured to the underneath side of the trailer frame as illustrated at 11, Figure 1. Depending from the upper fifth wheel 11 is a king pin 7 for connecting with the lower fifth wheel on the tractor 2.

The lower fifth wheel 3 is arranged to tip rearward when the tractor and semi-trailer are disconnected; so that during the coupling operation when the tractor 2 backs towards the trailer the forward end of the trailer is lifted up by the wings 12 of the lower fifth wheel 3 so that as the tractor moves under the semi-trailer 1 it elevates same as the king pin 7 slides between the wings 12 into the center opening 15 and couples with the latch 18.

Figure 2:
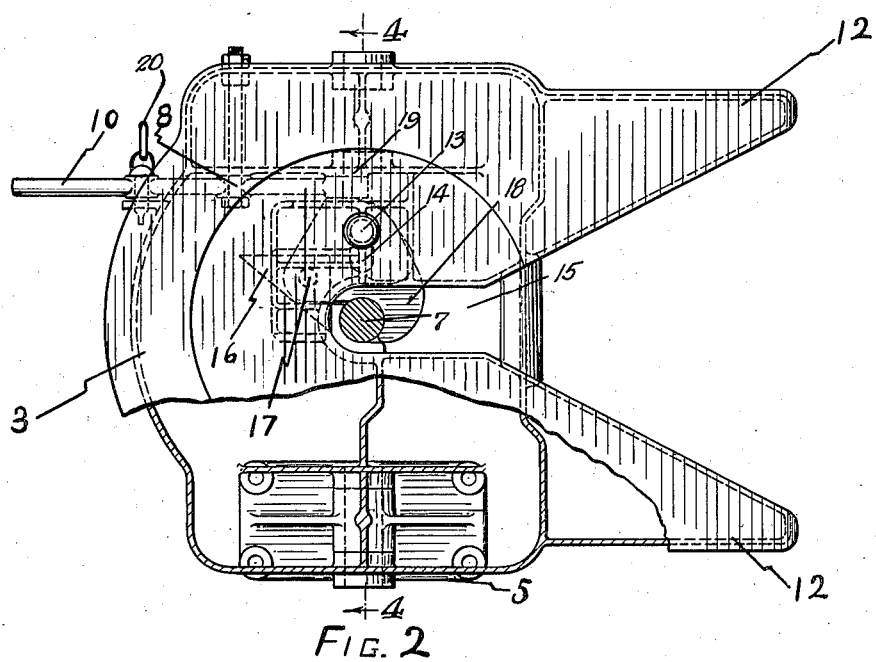
Figure 2 is a top view looking substantially on line 2—2 of Figure 1 showing the lower fifth wheel in plan with some parts cut away and with other parts in section.

Figure 2 shows the latch 18 in a locked position. The king pin 7 contacts with the triangular contact plate 16 moving same along the abutment 21. The latch 18 is connected with contact plate 16 by the pin 17 and therefore moves with the contact plate 16 until it is carried around the king pin 7 and locked between the abutments 19 and 22 by the locking lever 10.

Figure 3:
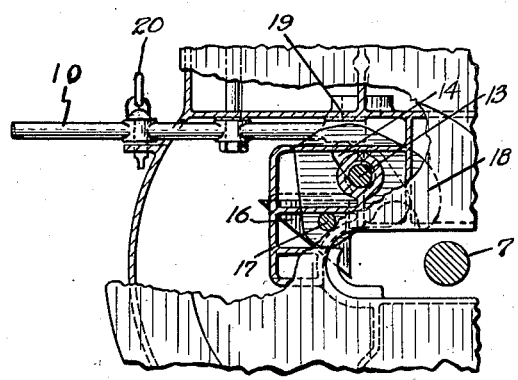
Figure 3 is a plan showing the latch mechanism in released position with the king pin in position to couple with the tractor when it is being backed into the trailer.

The slot 14 in latch 18 is to allow said latch to move between the abutments 19 and 22 depending on whether it is desired to couple or uncouple the trailer from the tractor. Fig. 3 shows the latch 18 in an unlocked position and it is to be noted that the locking and releasing lever 10 is in a released postion on top of the latch 18, thus allowing the latch 18 to move in the slot 14 away from the king pin 7 to a position against the abutment 19 when it allows the king pin 7 to clear the latch 18 as the vehicle is uncoupled. It is to be noted that the pin 13 in slot 14 in Fig. 3 is in the opposite end of the slot 14 in latch 18 from its location when the vehicles are coupled as shown in Fig. 2. No springs are necessary in connection with the latch for the reason that it is always in a horizontal position when uncoupled and, therefore, has no tendency to move because the trailer is at rest when the latch is uncoupled. It is to be noted that the triangular contact plate 16 is kept from turning by its contact with the abutment 21 and that the function of the slot 14 in the latch 18 is to allow the latch 18 to swing on the pin 17 for releasing when the locking lever 10 is in a released position as shown in Fig. 3.

The lower fifth wheel 3 is pivoted transversely on the pins 6 which in turn are supported in the bases 5 attached to the tractor 2 by suitable bolts.

The operation of the fifth wheel is as follows: When the latch 18 is in the uncoupled position as shown in Fig. 3 the tractor is backed into the trailer contacting the king pin 7 with the contact plate 16 thereby moving the latch 18 to a position shown in Fig. 2 allowing the locking and releasing lever 10 to automatically assume a locking position between latch 18 and the integral abutment 19 on the lower fifth wheel 3. The locking lever 10 is then further secured in place by the locking pin 9 which in turn is secured to the fifth wheel 3 by the locking chain 20.

Uncoupling is secured by releasing the locking lever 10 from between the latch 18 and the integral abutment 19 when the tractor can be separated from the trailer leaving the latch 18 as shown in Fig. 3 ready for use when desired. It is customary to supply landing wheels for the front end of the trailer when same is not used in connection with the tractor.

It is thought that the invention and its advantages will be understood from the foregoing description and drawings, and it will be apparent that various changes may be made in the form, construction and arrangement of the parts without departing from the spirit and scope of the invention or sacrificing all its material advantages, the form herein described being merely a preferred embodiment thereof.

This application is a division of application No. 711,861, filed February 19, 1934.

I claim:

In a lower fifth wheel member the combination of a single horizontal locking and releasing latch, a slot in said latch, a fixed pin in said slot to allow said slotted latch a limited movement of translation and turning in a horizontal plane parallel to the longitudinal axis of the fifth wheel, an underneath triangular contact member to contact the king pin for closing said latch, a locking and releasing lever fitting between said latch and an abutment on said fifth wheel all substantially as illustrated and described.

LEO F. LECHTENBERG.